(12) United States Patent
Ordonez et al.

(10) Patent No.: US 11,351,814 B2
(45) Date of Patent: Jun. 7, 2022

(54) AIRCRAFT WHEEL AND BEARING PROTECTORS WITH INTEGRATED INTERNAL PROTECTION PROTRUSION AND FASTENING MEMBER GUIDE

(71) Applicants: Jose Ordonez, Valencia, CA (US); Neil Waldron, Valencia, CA (US)

(72) Inventors: Jose Ordonez, Valencia, CA (US); Neil Waldron, Valencia, CA (US)

(73) Assignee: Bill Thomas Associates, Inc., Valencia, CA (US)

( * ) Notice: Subject to any disclaimer, the term of this patent is extended or adjusted under 35 U.S.C. 154(b) by 612 days.

(21) Appl. No.: 15/859,566

(22) Filed: Dec. 31, 2017

(65) Prior Publication Data

US 2019/0001746 A1 Jan. 3, 2019

Related U.S. Application Data

(60) Provisional application No. 62/441,282, filed on Dec. 31, 2016.

(51) Int. Cl.
| | |
|---|---|
| *B60B 7/04* | (2006.01) |
| *B60B 7/01* | (2006.01) |
| *B60B 7/02* | (2006.01) |
| *B60B 7/06* | (2006.01) |

(52) U.S. Cl.
CPC ............. *B60B 7/04* (2013.01); *B60B 7/01* (2013.01); *B60B 7/02* (2013.01); *B60B 7/06* (2013.01); *B60B 2340/30* (2013.01); *B60B 2900/212* (2013.01); *B60Y 2200/51* (2013.01)

(58) Field of Classification Search
CPC ..... B60B 7/04; B60B 7/06; B60B 7/12; B60B 7/14; B60B 7/01; B60B 7/02; B60B 2340/30; B60B 2900/212
See application file for complete search history.

(56) References Cited

U.S. PATENT DOCUMENTS 4,304,279 A * 12/1981 Thomas ................ B65D 85/06
206/303
4,893,713 A * 1/1990 Thomas ................ B65D 85/06
206/304

(Continued)

FOREIGN PATENT DOCUMENTS

GB          2540554 A * 1/2017 ........... B60B 7/0013
WO   WO-2012139186 A1 * 10/2012 ............... B64F 5/50

*Primary Examiner* — Scott A Browne
(74) *Attorney, Agent, or Firm* — Tangent Law Group, PLLC; Eric J. Weierstall

(57) ABSTRACT

An aircraft wheel hub protector is adapted to engage an aircraft wheel including an aircraft tire on a rim. The aircraft wheel hub protector having two or more cover sections with a protective protrusion and coupling mechanism guide extending from the a first cover section and passing through a bearing race and internal surface within a hub of the rim of the aircraft wheel in such a fashion so as to provide a void within the protective protrusion. The second cover section is engaged with an opposed side of the aircraft wheel from the first cover section. A coupling mechanism passes through the void in the protective protrusion without having contact with the bearing race and internal surfaces within the hub of the rim and coupling the first cover section and securing the aircraft wheel hub protector to the aircraft wheel.

10 Claims, 6 Drawing Sheets

(56) References Cited

U.S. PATENT DOCUMENTS

| | | | | |
|---|---|---|---|---|
| 5,255,874 A | * | 10/1993 | Roussel | B64F 5/50 |
| | | | | 206/303 |
| 6,793,294 B2 | * | 9/2004 | Shih | B60B 7/0006 |
| | | | | 301/37.105 |
| 7,178,669 B2 | * | 2/2007 | Atkinson | A47F 7/04 |
| | | | | 206/304 |
| 8,613,356 B1 | * | 12/2013 | Ihnatisin | B62D 43/007 |
| | | | | 206/304 |

* cited by examiner

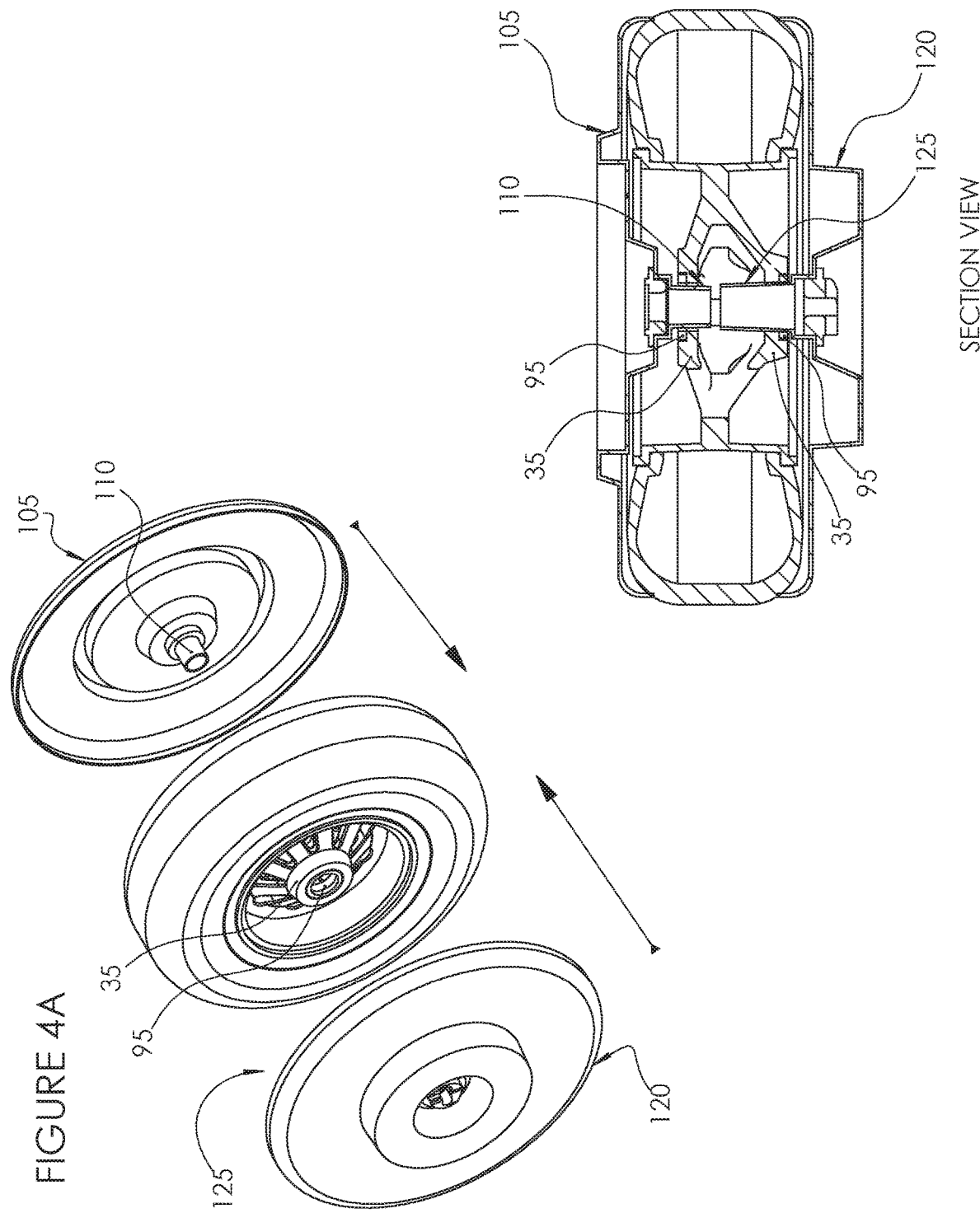

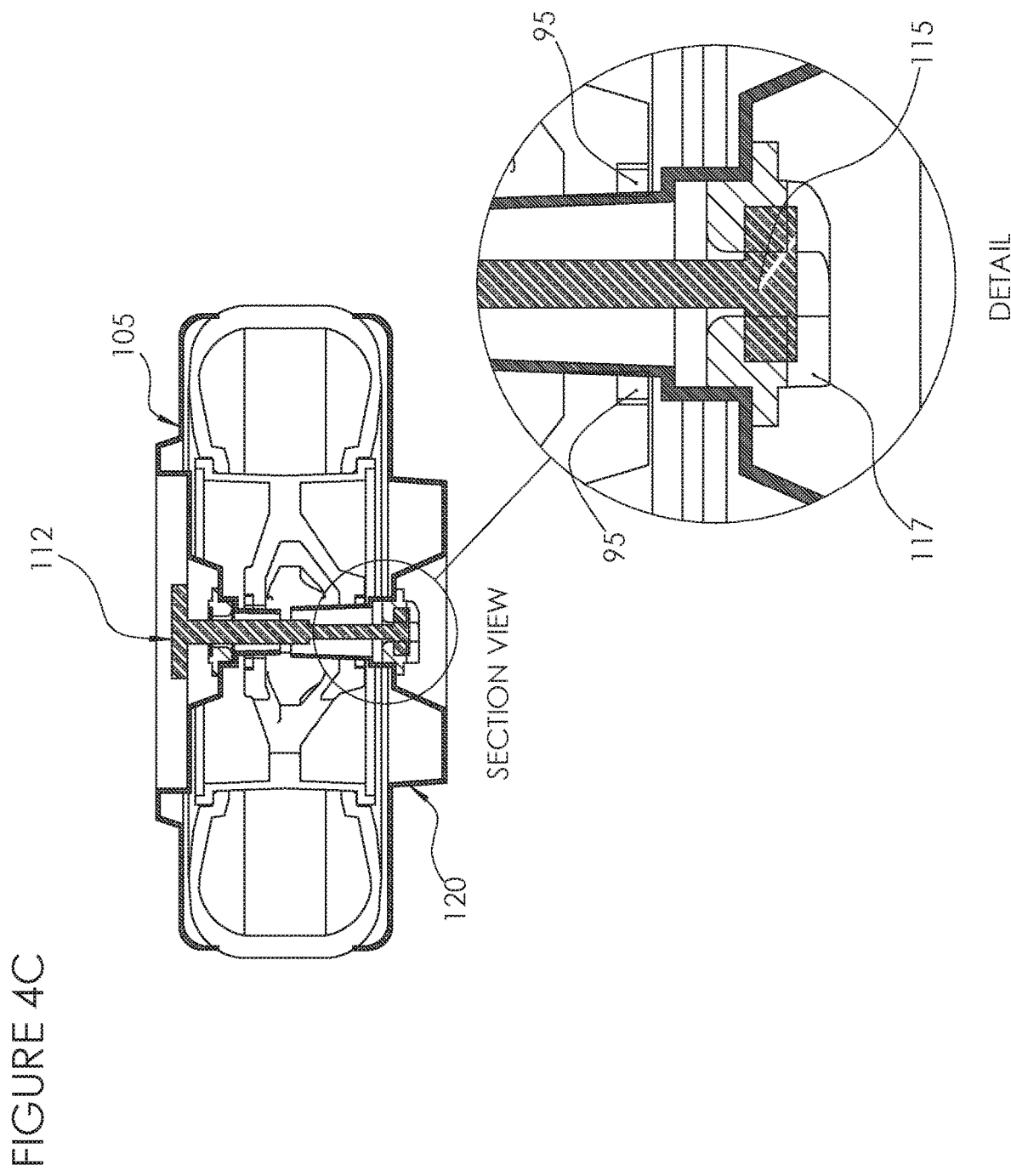

AIRCRAFT WHEEL AND BEARING PROTECTORS WITH INTEGRATED INTERNAL PROTECTION PROTRUSION AND FASTENING MEMBER GUIDE

CROSS-REFERENCE TO RELATED APPLICATIONS

This application claims the priority of U.S. provisional patent application 62/441,282, filed Dec. 31, 2016, which is incorporated herein by reference.

BACKGROUND OF THE INVENTION

Field of the Invention

The invention relates to a device and method for providing protective protrusions in an aircraft wheel assembly protector to protect and guide a T-bar or equivalent connector to retain wheel protector elements.

Background of the Invention

Industry leading aircraft wheel protector covers are most often designed to protect the outer surfaces of an aircraft wheel assembly from damage during transport. This includes the outer faces of the metal part of the aircraft wheel, the outward face of the bearings, the outer flanges, and in the case of wheel pallets, the tire sidewall as well. To accomplish this, typically a protective cover is placed so as to surround the enumerated components of the wheel, the wheel rim, and the bearings. The cover is typically provided as two halves which seat inside the tire and extend outward and inward to engage the rim of the aircraft wheel assembly. The vast majority of these designs utilize what is referred to in the industry as a T-bar or its equivalent to tie both halves of the cover together and tighten it in place.

When installing the T-bar to tie or couple both halves of the cover together, it is often the case that the metal T-bar contacts the internal metal surfaces of the aircraft wheel, potentially causing nicks or scratches and most certainly transferring grease to the T-bar from the bearing surfaces. In the existing covers, the protective plastic extends about and over both the internal and external surfaces relative to the tire and rim, but there is no part of the cover that directly protects the wheel bearings and internals in situ. That is, the cover in existing designs extends over and covers the internal components from external forces and intrusions but does not in and of itself complement or directly protect these parts, even from the T-bar.

Protecting these internal components and specifically the wheel bearings is important. On some aircraft wheel assemblies, the bearings are retained with a retaining-clip. The clip is not designed for loading from stacking or impact or similar mistreatment that can be occasioned during the shipping process. Though unlikely to be fully dislodged, misalignment and damage from improper installation of the covers can occur and mishandling during shipment may also result in damage.

On a few aircraft wheel assembly models, the bearings are unretained and rely on proper installation of the wheel on the aircraft axle to keep the bearings in the proper place. For wheels with unretained bearings, it is possible for the end user installing the covers to place the T-bar through the wheel in such a way that the unretained bearing may become dislodged and fall out of the wheel assembly. This of course can lead to installation errors and dangerous conditions on the aircraft if the wheel assembly is installed without the realization that the bearing race is misaligned or missing or damaged or otherwise impaired by impact.

Thus a need exists for a wheel and bearing protector designed to protect against the encroachment of shipping and pallet packing preparations from damaging the internal components of the aircraft wheels and bearings. The needed wheel and bearing protector would provide protection to the inside of the wheel as well as the outer surfaces. To date existing aircraft wheel and bearing protectors do not provide the necessary features needed and such a device would solve a distinct problem by enhancing the protective ability of such covers.

SUMMARY OF THE INVENTION

It is an aspect of the invention to provide internal protective protrusions in an aircraft wheel and wheel bearing cover that will both guide the installation of the T-bar for ease of installation and also protect the inner surfaces of the aircraft wheel. This feature will also prevent unretained bearings from being dislodged by inaccurate installation of the T-bar.

A further aspect of the invention is to prevent damage from misalignment of the T-bar via protrusions utilized to guide the T-bar without the possibility of it becoming engaged with the wheel bearings or race.

Yet a further aspect of the invention is the prevention of damage from misalignment of the T-bar via protrusions utilized to guide the T-bar without the possibility of it becoming engaged with the wheel bearings or race.

An object of the invention is to prevent damage from ejection, misalignment, or ejection and misalignment of unretained wheel bearings via guided insertion of the T-bar via protrusions utilized to guide the T-bar without the possibility of it becoming engaged with or otherwise impinged the wheel bearings or race.

The invention includes an article of manufacture, an apparatus, a method for making the article, and a method for using the article.

The apparatus of the invention includes an apparatus with a first and second of an at least two wheel hub cover with and an at least one protrusion protecting an internal hub and/or journaled bearings and a coupling arrangement for coupling the first and second wheel of the at least two cover portions with the protrusion engaged with the internal hub and/or journaled bearings.

The apparatus of the invention further includes an aircraft wheel hub protector adapted to engage an aircraft wheel, including an aircraft tire on a rim, with the aircraft wheel hub protector. A first cover section of an at least two cover sections is provided. A protective protrusion and coupling mechanism guide extending from the first cover section of an at least one cover section and passing through a bearing race and internal surface within a hub of the rim of the aircraft wheel in such a fashion as to provide a void within the protective protrusion. A second cover section of an at least two cover section is provided and engaged with an opposed side of the aircraft wheel from the first cover section of an at least two cover sections. A coupling mechanism is also provided, with the coupling mechanism passing through the void in the protective protrusion and thereby passing through the aircraft wheel and rim without having access to the bearing race and internal surface within the hub of the rim of the aircraft wheel and coupling the first cover section of an at least two cover sections to the second of an at least two cover sections and securing the aircraft wheel hub protector to the aircraft wheel.

The method of the invention includes a method of using an aircraft wheel cover with protective protrusions on an aircraft wheel, comprising the steps of aligning a first of an at least two wheel cover portions, the first wheel cover portion having an at least one protrusion thereon; aligning a second of an at least two wheel cover portions, passing the at least one protrusion through the aircraft wheel, the aircraft wheel having a rim and a hub with an at least one bearing race therein, the at least one protrusion thereon being thereby engaged with the aircraft wheel such that the protrusion extends to and engages the second wheel cover through the hub; passing an at least one securement device through the at least one protrusion and inserting said securement device into the at least one protrusion such that the at least one protrusion guides the at least one securement device through the hub while protecting the at least one bearing race and an at least one internal surface; and securing the first of the at least two wheel cover portions to the second of the at least two wheel cover portions with the at least one securement device, wherein the first portion of the at least two wheel cover is coupled to the second of the at least two wheel cover portions.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIGS. 4A-C show the steps of an exemplary method for installing the exemplary embodiment of FIG. 2 on an aircraft wheel.

DETAILED DESCRIPTION OF THE INVENTION

Figure 1:
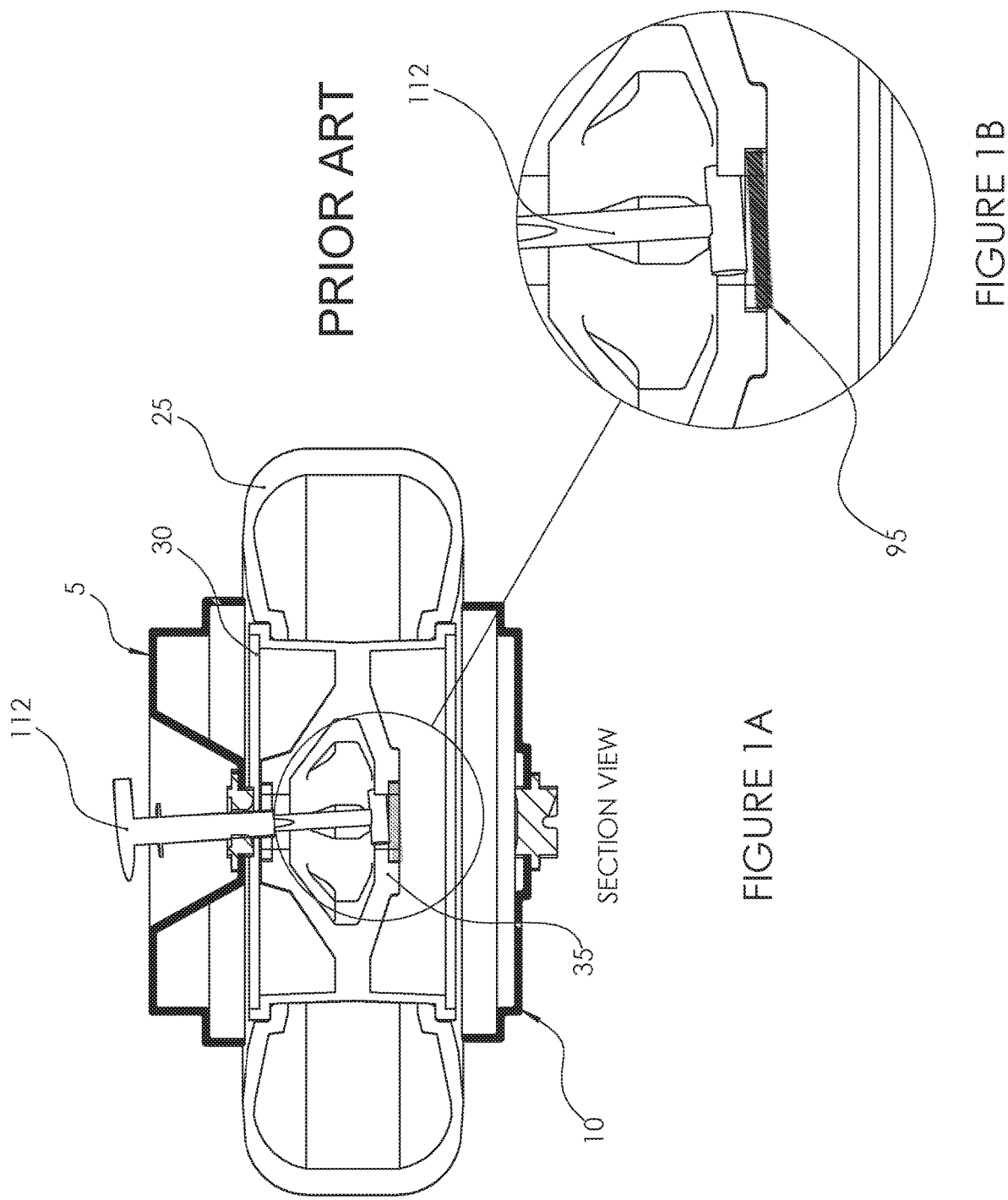
FIG. 1A shows a cross section of a prior art aircraft wheel cover with a misaligned T-bar.
FIG. 1B shows a close up of the aircraft wheel cover of FIG. 1A showing the misalignment of the T-bar in the hub of the wheel impacting the bearing race and internal surfaces.

FIG. 1A shows a cross section of a prior art aircraft wheel cover with a misaligned T-bar. An aircraft wheel cover 1 is shown with a protective cover 5,10 coupled together by a securing device, here a metal T-bar 112. As seen in the figure the protective cover provides protection against exterior forces and impacts to areas within the tire, rim and wheel hub. However, the surfaces inside the hub of the wheel remain exposed to the T-bar 112 during the insertion of the T-bar 112 into the device.

As noted and shown in FIG. 1A, in the prior art when installing the T-bar 112 to tie both halves of the prior art cover together the metal T-bar 112 can come in contact with the internal metal surfaces of the aircraft wheel if not installed properly. The improper installation can cause nicks or scratches and transfers grease to the T-bar from the internal surfaces 96 and bearing races 95, depriving them of the needed protection of the grease. In the prior art covers, the protective plastic cover extends about and over the tire and rim. But there is no part of the cover 5,10 that protrudes into the area of axle mounting point and directly protects the wheel bearing races 95 and internal surfaces 96 in situ from the T-bar 112. That is, the cover 5,10 extends over and covers the internal components from external forces and intrusions but does not in and of itself complement or directly protect these parts from the T-bar or similar objects inserted or thrust within it that impacts the internal components in any fashion.

Protecting these internal components and specifically the wheel bearings is important in the proper operation of the wheel on the aircraft. On some aircraft wheel assemblies, the bearings are retained with a retaining-clip. The clip is not designed for loading from stacking or impact or similar mistreatment that can be occasioned during the shipping process. Though unlikely to be fully dislodged, misalignment and damage from improper installation of the prior art cover and its T-bar can occur and mishandling during shipment may also result in damage.

In addition a few aircraft wheel assembly models, the bearings are not retained or unretained and rely on proper installation of the wheel on the aircraft axle to keep the bearings in the proper place. For wheels with unretained bearings, it is possible for the end user installing the prior art covers depicted to place the T-bar through the wheel in such a way that the unretained bearing may become dislodged and fall out of the wheel assembly. This of course can lead to installation errors and dangerous conditions on the aircraft if the wheel assembly is installed without the realization that the bearing race is misaligned or missing or damaged.

FIG. 1B shows a close up of the aircraft wheel cover of FIG. 1A showing the misalignment of the T-bar 112 in the internal surfaces 96 and wheel race bearing 95 of the aircraft wheel assembly 2520. The misalignment of the coupling device, using the example of a T-bar 112 as shown, as an example of the type of error that can occur and cause the damage to the internal components of the wheel hub due to the prior art design. Misalignment and damage from improper installation of the covers and the fastening device, here T-bar 112, can occur when the exposed bearing surfaces 96 and bearing races 95 inside the hub 35 are impacted by the T-bar 112. This damage can also occur from mishandling during shipment impacting the T-bar 112. And on some aircraft wheel assembly models, as previously noted, the bearings races 95 and internal surfaces 96 are not retained and rely on proper installation of the aircraft wheel assembly 20 on the aircraft axle to keep the bearing race(s) 95 in the proper place. For such installations with unretained bearings, it is very possible for the end user installing the covers to place the T-bar through the wheel in such a way that the unretained bearing races 95 may becomes dislodged and falls out of the aircraft wheel hub 35 and get lost in transit or during packing.

Figure 2:
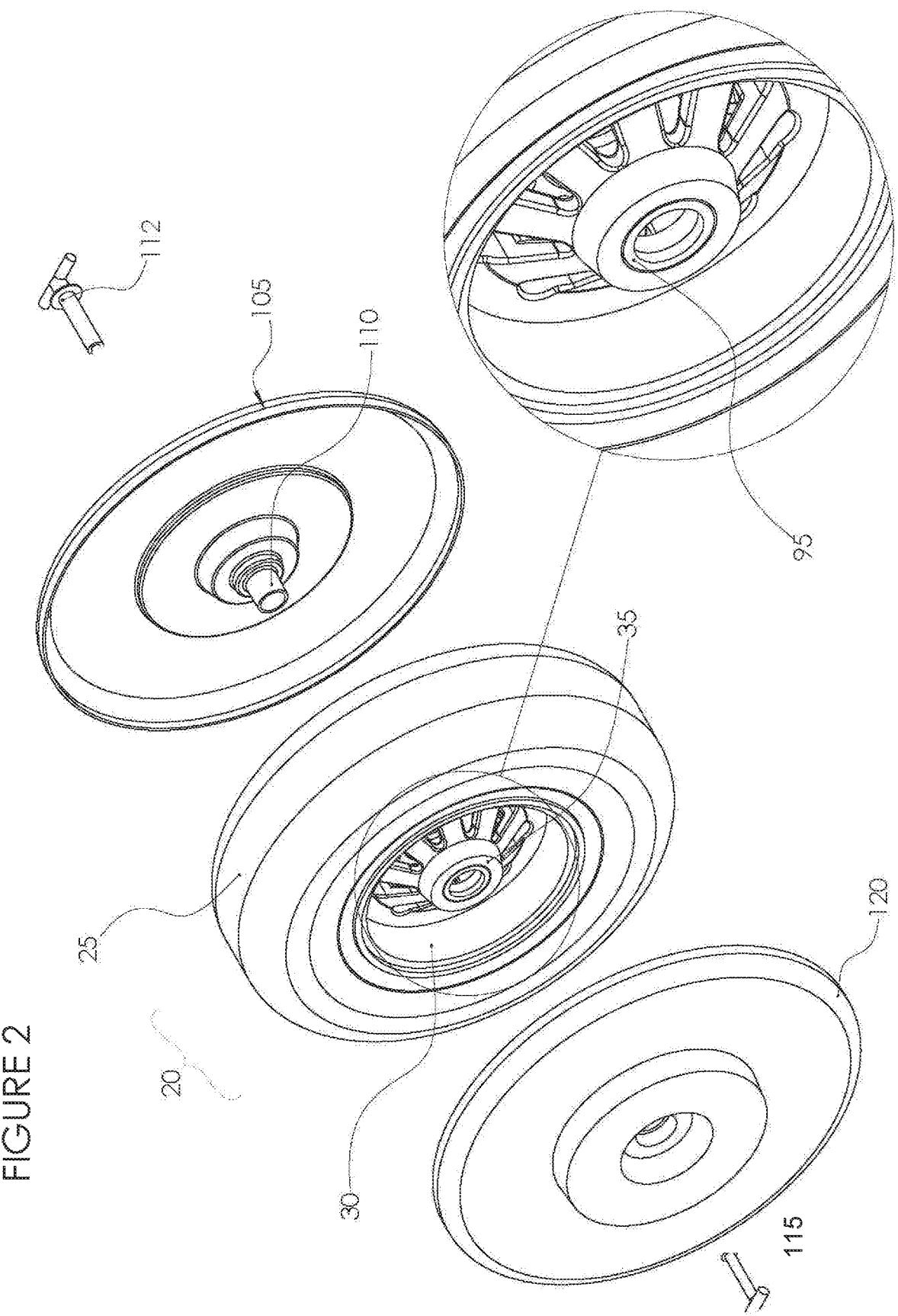
FIG. 2 shows an exploded view of an exemplary embodiment of the instant invention an aircraft wheel and bearing protector assembly.

FIG. 2 shows an exploded view of an exemplary embodiment of the instant invention an aircraft wheel and bearing protector assembly. The exemplary embodiment shown provides an aircraft wheel and bearing protector with integrated internal protection protrusion and T-bar fastening guide. An aircraft wheel 20 is shown comprising a tire 25 on a rim 30, having a hub 35, and a bearing race 95 and internal surfaces 96. An exemplary embodiment of an aircraft wheel cover is shown in a disassembled state. A first cover section 105 is attached to one side of the aircraft wheel 20. A protective protrusion and guide 110 is provided such that it extends through the hub 35 and protects the bearing race 95 and internal surface 96. Although two cover sections 105, 120 are provided in the exemplary embodiment, nothing prohibits further protective elements or fewer protective members being included in further exemplary embodiments of the invention. However at least two protective elements are provided to cover each side of the wheel 20 in this embodiment.

A second cover section 120 is provided and aligned with an opposed side of the aircraft wheel 20 from the first cover section 105. A protective protrusion and guide 125 is provided on the second cover section, as better seen in FIG. 3. Although the exemplary embodiment utilizes two such protrusions, further exemplary embodiments are contemplated whereby a single protrusion is provided and still further embodiments utilizing several protrusions are contemplated. The importance of the protrusion element or elements being evident in that they provide protection for the components that are internal to the hub 35 of the aircraft wheel 20 and the bearing races 95 and internal surfaces 96 therein.

The first and second cover sections 105, 120 are arranged during installation in a manner in which the exterior of the wheel 20 to the rim 30 as shown to protect the rim 30 and the hub 35 and the internal surfaces 96 and bearing race 95 of the hub 35 from damage. This is further shown and discussed in relation to FIGS. 4A-C below showing the installation process.

Figure 3:
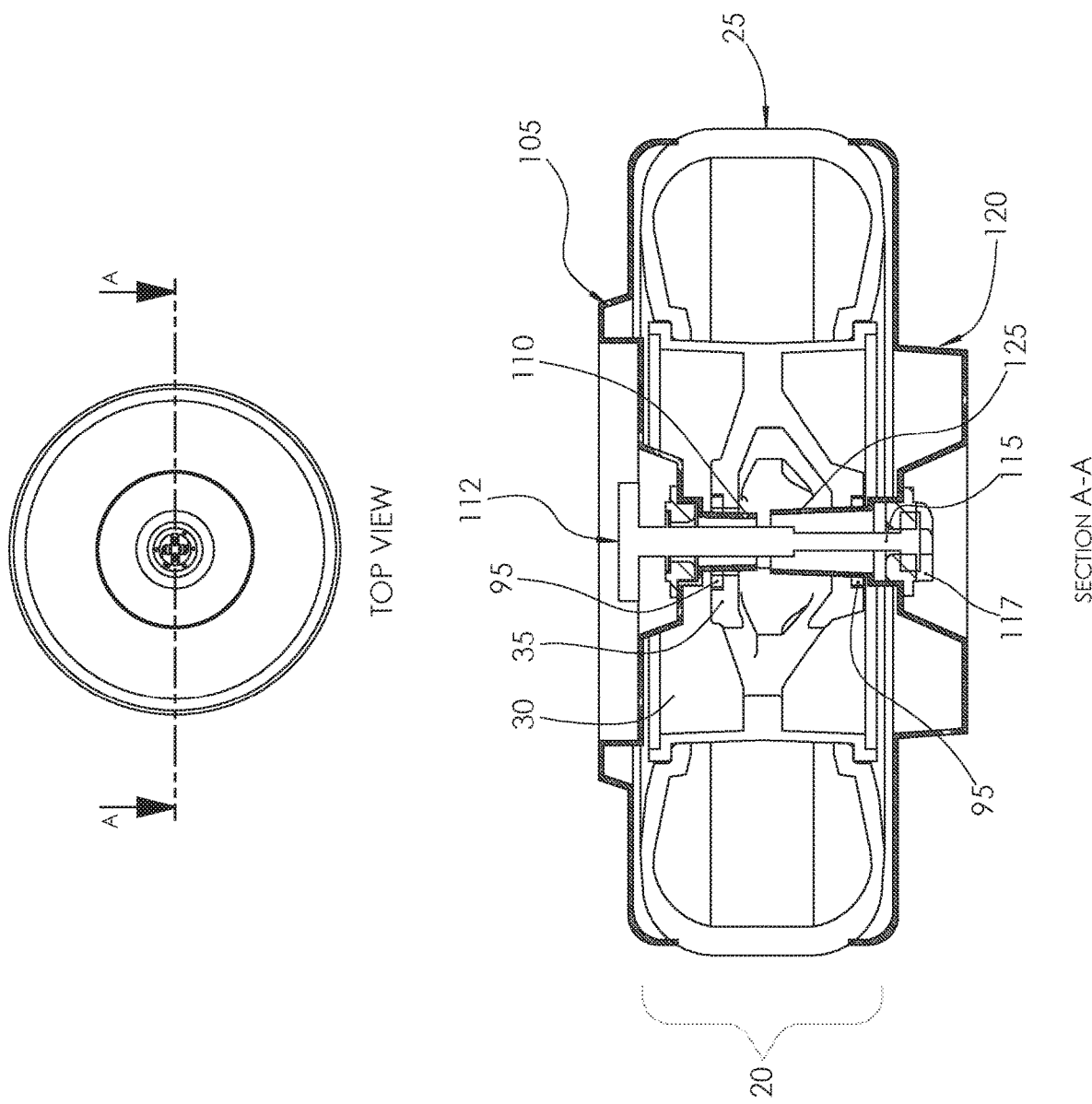
FIG. 3 shows a cross section of an assembled upper and lower protective cover members of the exemplary embodiment of FIG. 2.

FIG. 3 shows an assembled view of the upper and lower protective cover members of the exemplary embodiment of FIG. 2. This view more clearly shows the assembly of the exemplary embodiment of FIG. 2 as installed. As more clearly seen in this figure, the protrusions 110, 125 extend from the first cover portion 105 and second portion 120 of an at least two cover portions respectively and penetrate through the hub 35 of the rim 30 and simultaneously through the bearing race 95 and internal surfaces 96 to protect same. The extended securing member, in this instance T-bar 112, passes through the first cover portion 105 of the wheel cover 100 and along the protrusions 110, 125, protecting the bearing race/internal surfaces 95, and through to the second cover portion 120 of the wheel cover 100 where the T-bar 112 has a threaded end 115 which extends out and is engaged and secured by a securing member 117, here shown as a nut attached to a threaded end.

Figure 4B:
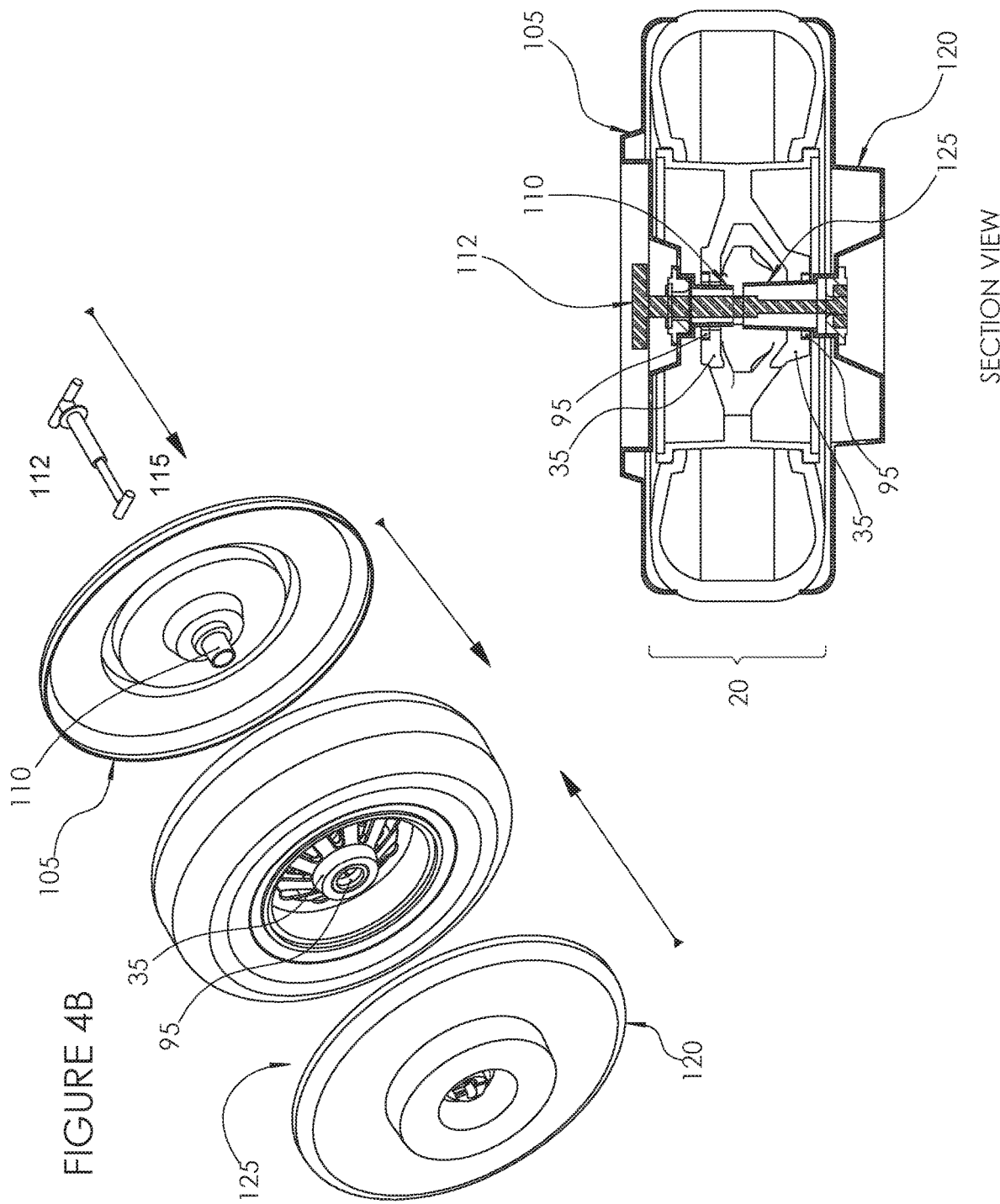

FIGS. 4A-C show the steps of the method for installing the exemplary embodiment of FIG. 2 on an aircraft wheel. In a first step, shown in FIG. 4A. In an exemplary method of installation, in a first step the first cover section 105 is located above the aircraft wheel 20 with the protrusion and guide 110 aligned with the hub 35 and bearing race 95 and internal surfaces 96. A second cover portion 120 is aligned on the side opposite the first cover section 105, the protrusion and guide 125, extending from the second cover portion 120 and also being aligned with the hub 35 and bearing race 95 and internal surface(s) 96. The first and second portion of an at least two cover portions 105, 120 being moved into communication with one another such that the protrusion and guides 110, 125 passes through the hub 35 and bearing race and internal surface 95 of the aircraft wheel assembly 20.

FIG. 4 B shows a further step in the installation of the exemplary embodiment of the invention shown in FIG. 2. In a second step, as shown in FIG. 4B, an extended securing member, here shown as a T-bar 112, is separated from its end 115 and then aligned with the protrusion and guides 110, 125 and inserted into the protrusion and guide 110, 125 such that the extended securing member 112 passes through both the first and second portions of the instant invention. As noted above, the protrusion and guide 110, 125 prevent the extended securing member 112 from contacting the bearing race or internal surfaces, protecting the aircraft wheel assembly 20 from improper installation of the securing member 112, dislodgement of or impact with the internal surfaces and the bearing race 95 of the wheel assembly 20, and other issues involving the alignment of the instant invention or the securing member 112.

FIG. 4C shows a further step in the installation of the exemplary embodiment of the invention shown in FIG. 2. In a third step shown in FIG. 4C, the extending securing member 112 has its end 115 that is engaged with a securing member 117 for example but certainly not limited to a nut, and the instant invention secured to the aircraft wheel 20 without impacting the bearing race or its internal components 95 while positively and properly aligning the extended securing member 112 to affix the aircraft wheel cover 100 to the aircraft wheel assembly 20.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. An aircraft wheel hub cover on an aircraft wheel having a rim and a hub, the hub including a support portion that extends radially inward from the rim in the radially middle portion of the rim with an at least one bearing race therein and an opposed support portion disposed on an opposite side of the hub in the radially middle portion of the opposite side of the hub with a void passing through the hub on the rim therebetween, comprising:

a first of an at least two wheel hub cover portions;

a second of the at least two wheel hub cover portions;

an at least one protrusion extending from said first of the at least two wheel hub cover portions such that the first of the at least two wheel hub cover portions engages the aircraft wheel so that the at least one protrusion is received in the support portion and thereby engages and secures the at least one bearing race and the at least one protrusion extends axially beyond the support portion and into the hub toward the second wheel hub cover portion through the void in the hub, and an at least one securement device having at least a first securing member and a second securing member of an at least two securing members, wherein the first securing member of the at least one securement device is inserted into the at least one protrusion such that the at least one protrusion guides the first securing member of the at least one securement device through the hub while protecting the at least one bearing race from contact with the first securing member of the at least one securement device as the protrusion extends past the at least one bearing race and the support portion and into the hub of the aircraft wheel and the second securing member of the at least one securement device engages the second of the at least two wheel hub cover portions and secures the aircraft wheel hub cover to the aircraft wheel.

2. The aircraft wheel hub cover of claim 1, wherein the second securing member of the at least one securement device engages the first securing member of the at least one securement device and is thereby aligned and engages the at least one securement device so as to secure the aircraft wheel hub cover to the aircraft wheel.

3. The aircraft wheel hub cover of claim 1, wherein the second securing member of the at least one securement device extends into and is received by the opposed support section on the opposite side of the hub.

4. The aircraft wheel hub cover of claim 3, wherein the second of the at least two wheel hub cover portions has a further protrusion extending therefrom such that the further protrusion is received in the opposed support portion.

5. The aircraft wheel hub cover of claim 4, wherein the second securing member is engaged with the second wheel cover portion and at the further protrusion engages with the first member of the at least one securement device to secure the wheel cover to the aircraft wheel.

6. The aircraft wheel hub cover of claim 2, wherein the at least one securement device mates on a section of the second of the at least two wheel hub cover portions such that the at least one securement device is engaged indirectly with the opposed support portion of the hub.

7. The aircraft wheel hub cover of claim 1, wherein the at least one securement device is a T-bar.

8. The aircraft wheel hub cover of claim 1, wherein the at least one protrusion is integral to the first of the at least two wheel hub cover portions.

9. A method of using an aircraft wheel cover on an aircraft wheel, the aircraft wheel having a rim and a hub, the hub including a support portion that extends radially inward on the rim in the radially middle portion of the rim with an at least one bearing race therein and an opposed support portion disposed on an opposite side of the hub from said support section with a void passing within the hub therebetween, the method comprising:

aligning a first of an at least two wheel cover portions, the first wheel cover portion having an at least one protrusion thereon; aligning a second of the at least two wheel cover portions with the opposed side of the hub of said aircraft wheel;

engaging the first of the at least two wheel cover portions such that the at least one protrusion is received in the support portion and thereby engages and secures the at least one bearing race and the at least one protrusion further extends axially beyond the support portion and the at least one protrusion continuing to extend into the hub toward the second wheel hub cover portion through the void in the hub;

passing an at least one securement device into the at least one protrusion and passing said securement device into the at least one protrusion such that the at least one protrusion guides the at least one securement device through the void in the hub while protecting the at least one bearing race and an at least one internal surface from contact with the at least one securement device as it is passed within the hub; and securing the first of the at least two wheel cover portions to the second of the at least two wheel cover portions with the at least one securement device.

10. The method of using an aircraft wheel cover on an aircraft wheel of claim 9, wherein the second of the at least two wheel cover portions has a further protrusion extending therefrom such that the further protrusion is received in the opposed support portion and further comprising the steps of aligning the second wheel hub cover portion such that the further protrusion is received by the opposed support portion.

* * * * *